Sept. 11, 1956  A. R. SHAW ET AL  2,762,118
METHOD OF FORMING AN INTERLOCKING BUSHING
Filed July 13, 1953

INVENTOR.
Arthur R. Shaw
Robert J. Kick
BY
Attorney

—

United States Patent Office 2,762,118
Patented Sept. 11, 1956

2,762,118
METHOD OF FORMING AN INTERLOCKING BUSHING

Arthur R. Shaw and Robert J. Kick, Dayton, Ohio, assignors to General Motors Corporation, Detroit, Mich., a corporation of Delaware Application July 13, 1953, Serial No. 367,668

3 Claims. (Cl. 29—521)

This invention relates to bearings, and is particularly concerned with a method of making cylindrical bushings of the interlocking type.

It is a basic object of the invention to provide a bearing and method of making same wherein a cylindrical bushing is formed which is interlocked to prevent expansion of the bushing.

In carrying out the above object it is a further object to provide an interlock and method for obtaining the same wherein the bushing is formed in open cylindrical form and is then circumferentially compressed to partially form the interlock whereupon the portions of the bushing are axially deformed to fully form the interlock.

A still further object of the invention is to provide a method for making interlocked cylindrical bushings wherein interlocking portions such as a tongue and a mouth are formed on both ends of a flat strip of metal which is then formed into a substantially cylindrical shape whereupon the two interlocking ends are adjacent one another. Circumferential compression of the bushing causes the interlocking portions of the bushing to fit one within the other wherein the tongue portion deforms the mouth portion axially of the bushing. After the two interlocking portions are in fully abutting relation, those portions at the end adjacent the mouth are axially compressed for completing the interlock.

Further objects and advantages of the present invention will be apparent from the following description, reference being had to the accompanying drawings, wherein a preferred form of the present invention is clearly shown.

In the manufacture of cylindrical bushings, it is desirable to form some type of interlock at the abutting edges of the bushing whereby the bushing is prevented from opening and expanding during use.

This is necessary since in many instances these bushings are not fully supported externally thereof which permits a butt joint bushing to open slightly and thereby destroy the journal fit.

Various means have been provided for forming bushings having an interlock at the abutting portion, however, these methods are difficult to perform and require costly operations which are reflected in the ultimate cost of the bushing.

This invention is directed to a simple means for forming an interlock wherein the interlock may be made with a minimum of effort and expense. Specifically, bearing stock, such as bronze, babbit on steel, bronze on steel, copper lead on steel, aluminum, aluminum on steel or in fact any suitable bearing material is provided in strip form and blanks are punched therefrom in the flat condition wherein said blanks are predetermined as to dimension so that when the blank is formed in cylindrical form with the two end portions thereof abutting, a bushing having the desired diameter and bore is provided. In order to form the interlock, it is desirable to form interlocking portions on the two ends preferably in the form of a tongue and mouth or stated differently, a key and slot.

Figure 2:
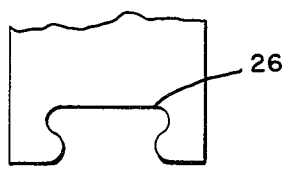
Figs. 2, 3 and 4 are fragmentary views of various progressive steps in the method for forming the interlock used in connection with the bushing shown in Fig. 1.
Figure 3:
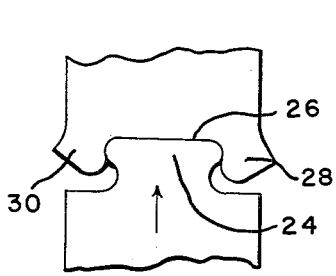
Figure 4:
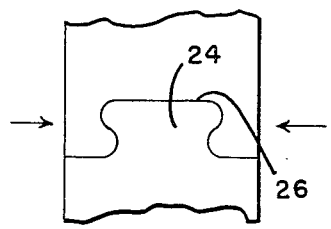
Figure 1:
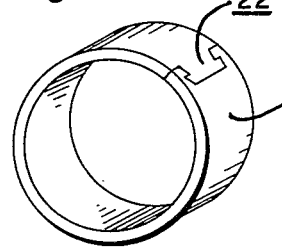
Fig. 1 shows a cylindrical interlock bushing in perspective.

Referring specifically to the drawings, Fig. 1 shows a typical bushing 20 of the interlocking type, wherein the interlock is shown at 22. Specifically, referring to Figs. 2, 3 and 4, the method of forming the interlock is shown. In Fig. 2, which is a fragmentary view of the two end portions of the bushing 20, a dovetailed tongue 24 is shown on one end of the bushing blank whereas a reduced entry dovetailed mouth portion 26 is shown on the other end of the blank. During cylindrical forming of this bushing, the tongue 24 and mouth 26 are aligned as shown in Fig. 2 and are then pressed toward one another by circumferential pressure in the direction of the arrow in Fig. 2. As the tongue 24 enters the mouth 26, the largest dimension of the tongue is considerably greater than the smallest dimension of the reduced portion of the entry to the mouth 26. Thus, as shown in Fig. 3, as the tongue forces through the mouth 26, the two side portions 28 and 30 of the mouth are deformed axially to permit entry of the tongue so that the tongue bottoms in the mouth as shown. During this circumferential or radial pressure operation, the bushing is preferably maintained on a mandrel of the desired diameter to prevent deformation of the bushing or is confined in a die. After the assembly has progressed to the position shown in Fig. 3, the bushing is held and axial pressure or side pressure is applied as noted by the arrows in Fig. 4 to press the portions or tines 28 and 30 back into their original position as shown in Fig. 2, whereupon the interlocking or tongue portion 24 is held within the mouth portion 26 by the tines 28 and 30. In this position, the bushing is completely formed and its diameter will be fully maintained.

Figure 5:
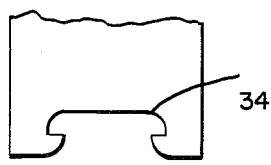
Figs. 5, 6 and 7 are views similar to Figs. 2, 3 and 4 using a different type of interlock.
Figure 6:
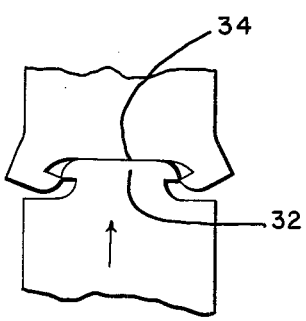
Figure 7:
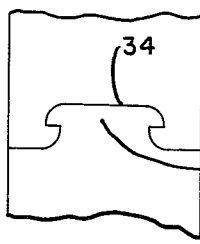

Figs. 5 through 7 show still another form of the invention wherein the steps of manufacture are the same but wherein a different shaped tongue 32 and mouth 34 are used.

Figure 8:
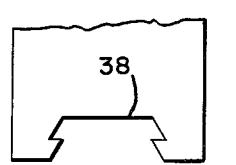
Figs. 8, 9 and 10 are also views similar to Figs. 2, 3 and 4 using still another type of interlock.
Figure 9:
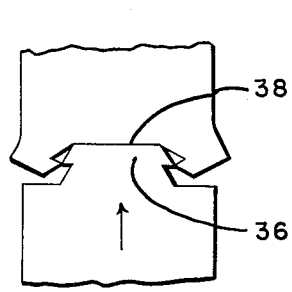
Figure 10:
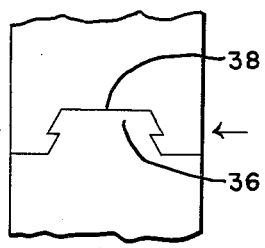

Figs. 8 through 10 show still another design of tongue 36 and mouth 38. In all of these latter designs, the method of assembly of interlocking is identical to that described in connection with the embodiment shown in Figs. 2 through 4. In other words, the bushing is formed and contracted circumferentially to bring the tongue into the mouth and to deform the tines at the side of the mouth for permitting the tongue to bottom therein whereupon axial pressure is applied to the tines to interlock the tongue in position and to bring the bushing to its desired shape and size.

It is apparent that this method of manufacture facilitates the interlocking of cylindrical bushings, since the steps involved are quite simple and it merely requires a two step process fully performed on a punch press to create an interlock positioning of the type disclosed.

In copending application Serial Number 367,491, filed concurrently herewith, another method for forming interlocked cylindrical bushings is shown.

While the form of embodiment of the invention as herein disclosed constitutes a preferred form, it is to be understood that other forms might be adopted as may come within the scope of the claims which follow.

What is claimed is as follows:

1. In a method for forming an interlocking cylindrical bushing, the steps comprising: forming a blank of flat stock having a tongue at one end of the blank and a mouth of complementary shape at the other end of the blank wherein the mouth has a reduced entry opening into an enlarged portion and wherein the tongue has an enlarged end portion with a reduced neck, forming the flat stock into cylindrical form and simultaneously forcing the tongue into the mouth by circumferential pressure, for simultaneously deforming the sides of the mouth outwardly, and finally after a full cylindrical bushing is obtained, applying axial pressure to the sides of the mouth to reestablish their original position for interlocking the tongue into the mouth.

2. The method of forming cylindrical bushings of interlocking type, the steps comprising: providing a flat blank having a tongue and mouth portion at opposite ends thereof adapted to be interlocked one into the other, partially forming said flat blank into cylindrical form whereby the tongue approaches the mouth, continuing the formation for forcing the tongue into the mouth for simultaneously deforming the sides of the mouth axially outwardly, and finally after a full cylindrical bushing is obtained, forcing the side portions of the mouth back to their original position by axial pressure exerted adjacent said deformed portions whereby an interlock is formed.

3. In a method for forming cylindrical bushings of the interlocked type, the steps comprising: providing a flat blank of bearing stock having substantially dovetailed portions adapted to form an interlock at opposite ends thereof, forming the blank into a cylindrical shape, simultaneously forcing the dovetail portions into interfitting connection one with the other by circumferential pressure applied for simultaneously deforming portions of the bushing dovetail axially thereof, and finally after a full cylindrical bushing is obtained, reestablishing the position of the deformed portions of the dovetail by axial pressure applied thereto for creating an interlocking joint at the seam of the bushing.

References Cited in the file of this patent

UNITED STATES PATENTS

| | | |
|---|---|---|
| 1,213,684 | Osterholm | Jan. 23, 1917 |
| 2,177,584 | Salansky | Oct. 24, 1939 |
| 2,283,918 | Dekome | May 26, 1942 |